No. 675,595. Patented June 4, 1901.
G. P. GEHRING.
EYEGLASSES.
(Application filed Mar. 29, 1901.)
(No Model.)

Witnesses
Bernard M. Offutt
A S Cassell

Inventor
Gustave P. Gehring
by David P. Moore
Attorney

THE NORRIS PETERS CO., PHOTO-LITHO., WASHINGTON, D. C.

UNITED STATES PATENT OFFICE.

GUSTAVE P. GEHRING, OF PHILADELPHIA, PENNSYLVANIA.

EYEGLASSES.

SPECIFICATION forming part of Letters Patent No. 675,595, dated June 4, 1901.

Application filed March 29, 1901. Serial No. 53,434. (No model.)

*To all whom it may concern:*

Be it known that I, GUSTAVE P. GEHRING, a citizen of the United States, residing at Philadelphia, in the county of Philadelphia and State of Pennsylvania, have invented certain new and useful Improvements in Eyeglasses, of which the following is a specification.

This invention relates to improvements in eyeglasses; and the main object of the invention is the provision of a device which will securely hold the glasses in place under all circumstances and which is very readily and easily attached to or detached from the nose of the wearer.

Another object of my invention is the provision of a very simple, durable, and inexpensive device for holding eyeglasses in position, thus producing a very efficient and practical article.

To attain the desired objects, my invention consists of an eyeglass embodying novel features of construction and combination of parts, substantially as disclosed herein.

Figure 1:
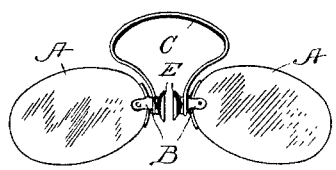
Figure 2:
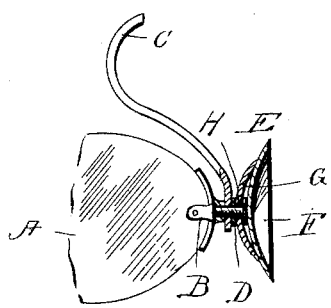
Figure 3:
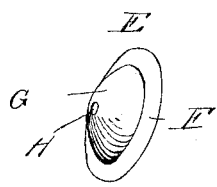
Figure 4:
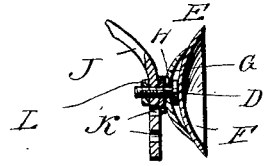
Figure 5:
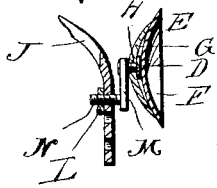
Figure 6:
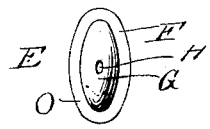

In the drawings, Figure 1 is a front view of a pair of eyeglasses provided with my improvement. Fig. 2 is a sectional view of one of the securing devices and a part of the frame. Fig. 3 is a perspective view of one of the pads detached. Figs. 4, 5, and 6 are modified constructions of securing pads and means.

Referring to the drawings, A designates the glasses, to which are secured the plates B, carrying the bow C and the stud or headed projection D. Adapted to be secured to the glasses by being engaged by the studs are the suction-pads E, which consist of the concaved flexible cups F, having the auxiliary concaved cup G vulcanized to the rear thereof and provided with the opening H, which is adapted to be passed over the head of the stud and allow the same to rest in the space between the two cups, as shown in Fig. 2.

In Fig. 4 I provide a stud, which is detachably mounted in a frame J, which is an elongation of one arm of the bow C, so that the cup or pad may be adjusted to accommodate the glasses to any person's eyes, this being done by means of forming openings K in the frame and allowing the outward ends of the studs to fit therein and be clamped in place by means of nuts L. One of the openings K not supporting the pad is in engagement with the proper plate B when the modifications are in use.

In Fig. 5 I employ the arm M, which is adapted to be detachably secured to the frame J, this arm carrying the stud and the pad. This arm is connected to the frame by means of a screw-and-nut device N.

In Fig. 6 I have illustrated the pads made in an elliptical form O, so as to give a longer surface to engage the nose of the wearer.

From this description, taken in connection with the drawings, the many advantages of my eyeglasses will be readily seen and appreciated; but, briefly stated, I would say that they are designed to be readily attached to the nose of the wearer and will not in any way become uncomfortable and unbearable, as do the glasses in general use, being secured to the nose of the wearer by flexible suction-pads, which will not allow the glasses to become accidentally detached.

What I claim as new, and desire to secure by Letters Patent, is—

1. An eyeglass, consisting of two glasses or lenses, plates connected to the adjacent edges of said glasses, a bow connecting the glasses together, studs connecting the lenses to the plates and each provided with a flat head upon its outer end, and a detachable suction-pad fitting upon each stud and held in place by the head thereof.

2. An eyeglass consisting of a pair of glasses, or lenses, a frame connecting the lenses, removable pins provided with heads upon their ends connected to said frame, and suction-pads carried by the headed pins consisting each of a concaved cup, an auxiliary concaved cup vulcanized to the rear of the other cup and provided with a central opening to allow the heads of the pins to be inserted and held in the spaces between the two cups.

In testimony whereof I affix my signature in presence of two witnesses.

GUSTAVE P. GEHRING.

Witnesses:
M. WIEGAND,
J. N. FORT, Jr.